United States Patent
Nguyen et al.

(10) Patent No.: US 8,667,667 B1
(45) Date of Patent: Mar. 11, 2014

(54) METHOD FOR FABRICATING A DISK DRIVE BASE FOR A DISK DRIVE

(75) Inventors: Diep L. Nguyen, Castro Valley, CA (US); Jifang Tian, Fremont, CA (US); Hongqi Li, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 329 days.

(21) Appl. No.: 13/005,727

(22) Filed: Jan. 13, 2011

(51) Int. Cl.
*G11B 5/127* (2006.01)
*H04R 31/00* (2006.01)

(52) U.S. Cl.
USPC .................. 29/603.03; 29/603.04; 29/603.06; 29/603.07; 72/379.2; 360/98.01

(58) Field of Classification Search
USPC .......... 29/603.03–603.07; 72/379.2; 384/100, 384/107, 114, 130, 119, 132; 360/97.01, 360/98.01
See application file for complete search history.

(56) References Cited

U.S. PATENT DOCUMENTS

| | | | | |
|---|---|---|---|---|
| 4,965,476 A | * | 10/1990 | Lin | 310/51 |
| 5,157,295 A | * | 10/1992 | Stefansky et al. | 310/90 |
| 5,727,882 A | | 3/1998 | Butler et al. | |
| 6,034,841 A | * | 3/2000 | Albrecht et al. | 360/99.17 |
| 6,256,173 B1 | | 7/2001 | Chee et al. | |
| 6,753,636 B2 | * | 6/2004 | Rehm et al. | 310/425 |
| 7,239,477 B2 | * | 7/2007 | Aiello et al. | 360/99.08 |
| 7,353,524 B1 | * | 4/2008 | Lin et al. | 720/633 |
| 8,009,384 B1 | * | 8/2011 | Little | 360/97.14 |
| 8,198,772 B2 | * | 6/2012 | Smirnov | 310/91 |
| 2005/0276527 A1 | * | 12/2005 | Yoo et al. | 384/100 |
| 2009/0273258 A1 | | 11/2009 | Aiello | |
| 2009/0279818 A1 | | 11/2009 | Le et al. | |

\* cited by examiner

Primary Examiner — Paul D Kim

(57) ABSTRACT

A disk drive includes a disk drive base comprising a first metal material. The disk drive base may include a first opening and a first attachment feature to which a head actuator assembly pivot may be attached. A motor support may be embedded in the first opening in the disk drive base. The motor support consists of a second metal material having a damping coefficient higher than that of the first metal material. A rotary spindle may be attached to the motor support, and a disk may be attached to the rotary spindle.

10 Claims, 6 Drawing Sheets

METHOD FOR FABRICATING A DISK DRIVE BASE FOR A DISK DRIVE

BACKGROUND

Disk drives are a type of information storage device that store information on at least one spinning disk. Other types of information storage devices include, for example, magnetic tape drives which retrieve stored information on magnetic tape (e.g. linear tape drive, helical scan tape drive). There are several types of disk drives. For example, there are so-called floppy disk drives, which store information on removable magnetic disks. There are also optical disk drives, which typically retrieve information stored on removable optical disk media. Magnetic hard disk drives typically store information on non-removable rigid magnetic disks. Also for example, there are magneto-optical disk drives, which share some of the characteristics of optical disk drives and magnetic hard disk drives.

All types of disk drives typically include a base, to which a spindle motor and a head actuator (or lens actuator) are affixed. It is known in the art that casting is a low-cost manufacturing method for fabricating the disk drive base. Typically cast bases include regions that are subsequently machined to create registering surfaces to facilitate precise positioning of certain disk drive components relative to each other (e.g. motor spindle, actuator, and/or ramp components). Many disk drive bases are cast from aluminum, or an alloy of aluminum, because such metals are easy to machine and light-weight relative to alternative metals such as steel or iron. Disk drive base weight has become a more important consideration since disk drives have become more frequently used in portable consumer electronics applications, such as laptop computers.

However, cast aluminum disk drive bases may have poor damping characteristics, which can exacerbate the consequences of mechanical vibrations and externally applied mechanical shocks. Therefore, there is a need in the art for a disk drive design that can better dampen mechanical vibrations and/or mechanical shocks, within modern disk drive cost and weight specifications.

DESCRIPTION OF THE PREFERRED EMBODIMENTS

Figure 1:
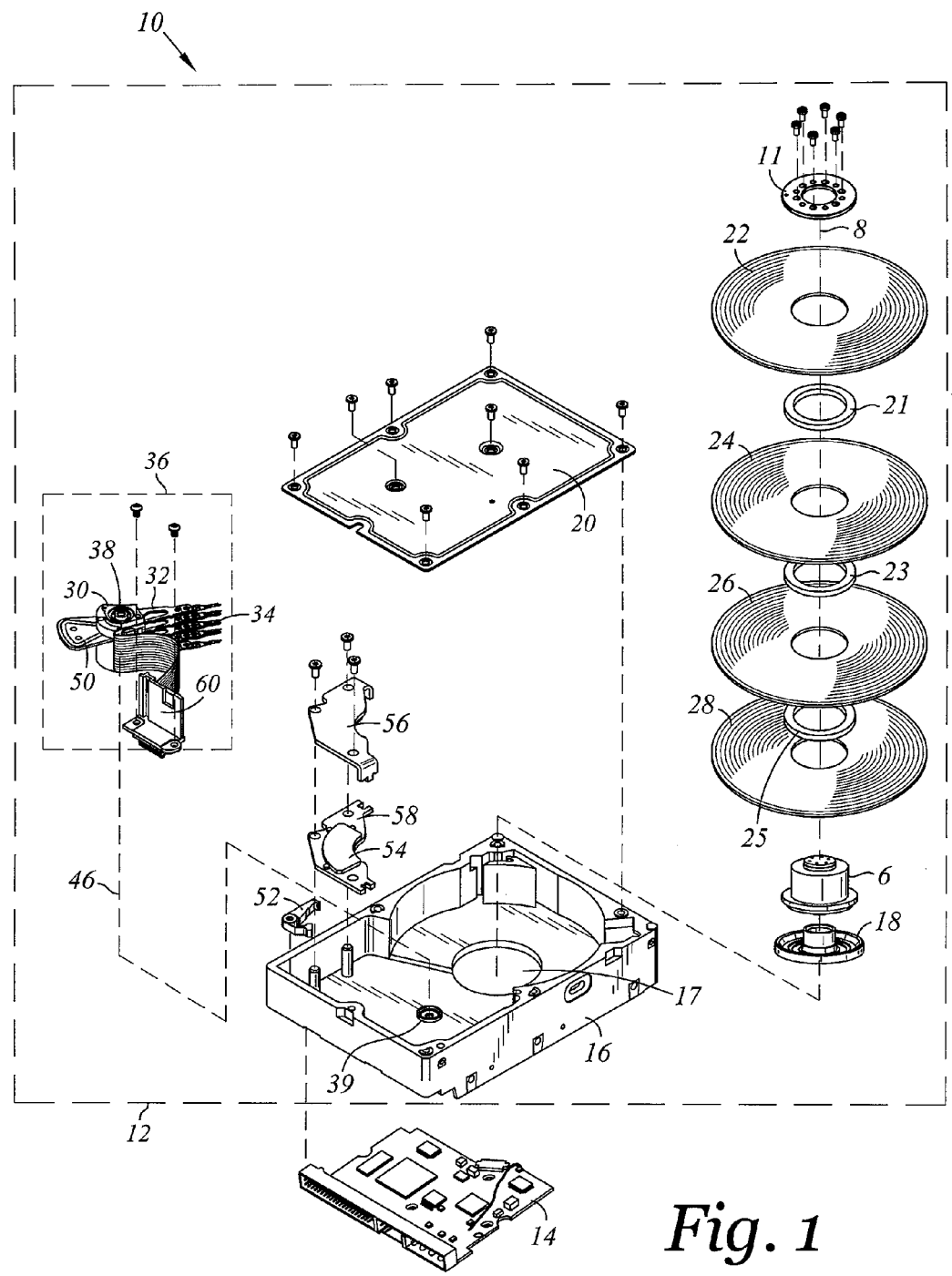
FIG. 1 is an exploded perspective view of a disk drive according to an embodiment of the present invention.

FIG. 1 is an exploded perspective view of a disk drive 10 according to an embodiment of the present invention. The disk drive 10 includes a head disk assembly (HDA) 12 and a printed circuit board assembly (PCBA) 14. The HDA 10 includes a disk drive base 16 and cover 20 that together house disks 22, 24, 26, 28. Disks 22, 24, 26, 28 may be annular magnetic disks or optical disks, for example. Each of the disks 22, 24, 26, 28 may contain a plurality of concentric tracks for storing data, disposed upon its opposing disk major surfaces.

In the embodiment of FIG. 1, the disk drive base 16 may comprise a first metal material. For example, the disk drive base 16 may comprise cast aluminum. Note that, although a disk drive base that is cast from a metal may include some machined surfaces, cast bases have unique structural characteristics that are different from stamped or forged bases, and/or bases that have been fabricated entirely by machining. For example, one of ordinary skill can structurally distinguish cast bases based on tell-tale regions of substantially different surface finish (e.g. ejector pin marks, pitted or ground surfaces corresponding to injection gates, and/or mold parting lines). One of ordinary skill may also structurally distinguish cast bases based on draft angles on otherwise vertical surfaces that assist with mold separation.

Accordingly, the word "cast," as used herein, is an adjective describing a structural characteristic of the base, rather than being used only as a process limitation. That is, a "cast base" is a resulting structure that one of ordinary skill would be able to distinguish from other types of bases based on structure alone, without previous knowledge of the manufacturing process. The fact that a cast base structure is not obtained by other fabrication methods does not remove the structural significance of "cast"; rather it just adds additional process significance.

In the embodiment of FIG. 1, the head disk assembly 12 further includes a rotary spindle 6 for rotating the disks 22, 24, 26, 28 about a disk axis of rotation 8. The rotary spindle 6 may be attached to a motor support 18 that may be embedded into a corresponding opening 17 in the disk drive base 16 of the HDA 12. The motor support 18 may consist of a second metal material having a damping coefficient higher than that of the first metal material of the disk drive base 16. For example, the motor support 18 may consist of cast iron. Disks 22, 24, 26, 28 may be stacked and separated with one or more annular disk spacers 21, 23, 25 that are clamped to the rotary spindle 6 by a disk clamp 11.

In the embodiment of FIG. 1, the HDA 12 further includes a head stack assembly (HSA) 36 rotably attached to the disk drive base 16 of HDA 12. Specifically, the HSA 36 may be rotably attached to the disk drive base 16 by use of a head actuator assembly pivot 38 that is engaged within a bore of an actuator body 30, and that is attached to the disk drive base 16. The disk drive base 16 includes an attachment feature 39 to which the head actuator assembly pivot 38 is attachable. For example, the attachment feature 39 may be a threaded hole, a smooth cast-and-machined hole for press-fitting, cast-and-machined post, or a press-fit post or another embedded support for the head actuator assembly pivot 38. The head actuator assembly pivot 38 may facilitate the HSA 36 to rotate relative to HDA 12 about an actuator pivot axis 46.

One or more actuator arms 32 may extend from the actuator body 30, and one or more head gimbal assemblies (HGA) 34 may be attached to a distal end of each actuator arm 32. Each HGA 34 may include a head (not visible on the scale of FIG. 1) for reading and writing data from and to an adjacent disk surface. The HSA 36 may further include a coil 50. The coil 50 may interact with one or more magnets 54 attached to disk drive base 16 via a yoke structure 56, 58, to form a voice coil motor for controllably rotating the HSA 36. The HDA 12 also optionally includes a latch 52 rotably mounted on the disk drive base 16 to prevent undesired rotations of HSA 36.

In the embodiment of FIG. 1, the PCBA 14 may include a servo control system for generating servo control signals to control the current through the coil 50 and thereby position the HSA 36 relative to concentric tracks disposed upon the surfaces of disks 22, 24, 26, 28. The HSA 36 may be electrically connected to PCBA 14 via a flex cable assembly 60, which may include a flex cable and a flex cable support bracket that attaches to the disk drive base 16.

Figure 2:
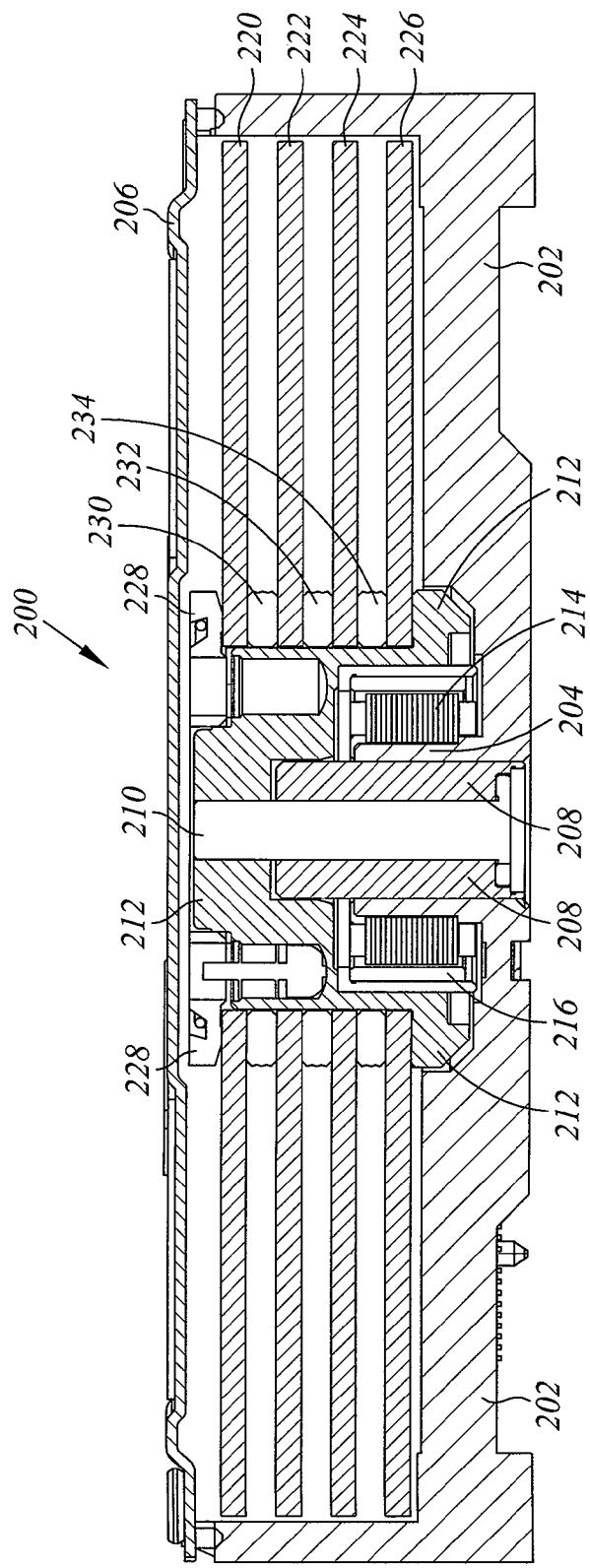
FIG. 2 is a cross-sectional view of a contemporary disk drive.

FIG. 2 is a cross-sectional view of a contemporary disk drive 200. Disk drive 200 includes a disk drive base 202 with integral motor support 204. A motor shaft 210 is supported by a bearing 208, which is held by the motor support 204. A motor hub 212 is attached to a top end of the motor shaft 210. The motor hub 212 is caused to rotate by a magnetic interaction between coils 214 and permanent magnets 216. Disks 220, 222, 224, 226 are mounted to the motor hub 212, and held in place on the motor hub 212 by a disk clamp 228. Spacers 230, 232, 234 are also mounted on the motor hub 212, between the disks 220, 222, 224, 226. A top cover 206, together with the disk drive base 202, encloses the disks 220, 222, 224, 226.

Figure 3A:
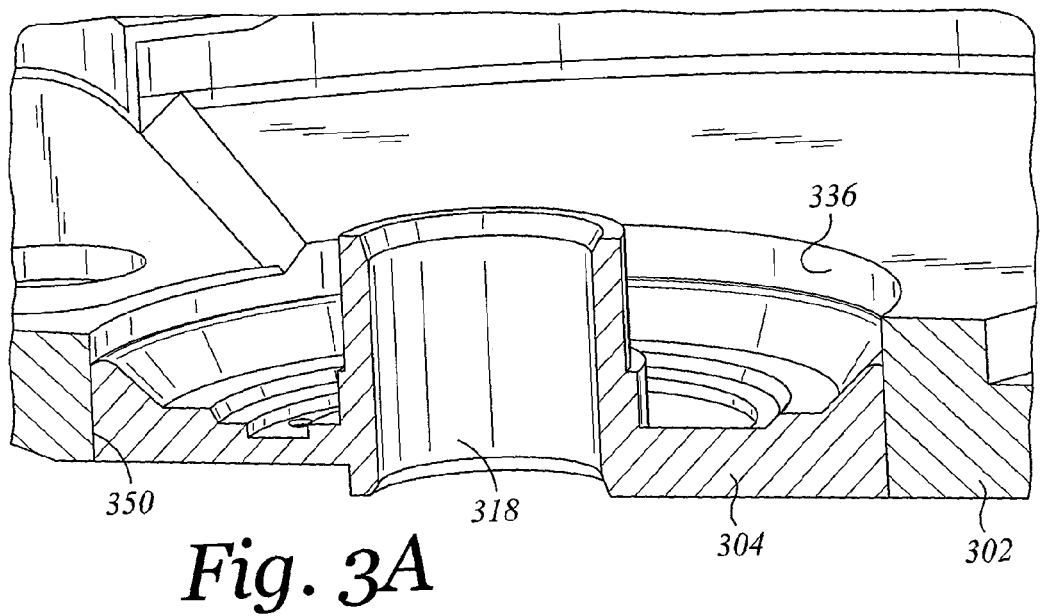
FIG. 3A is a cross-sectional perspective view of a motor support and disk drive base, according to an embodiment of the present invention.

FIG. 3A is a cross-sectional perspective view of a disk drive base 302, and a motor support 304 that is embedded in the disk drive base 302, according to an embodiment of the present invention. The motor support 304 includes a bore 318 for holding a bearing of a rotary spindle and thereby attaching the rotary spindle to the motor support 304. The disk drive base 302 comprises a first metal material (e.g. aluminum). The motor support 304 consists of a second metal material having a damping coefficient higher than that of the first metal material. For example, the second metal material may comprise iron. For example, cast iron, steel, and stainless steel, all comprise iron. The disk drive base 302 includes a first opening 336, and an interface 350 between the first opening 336 of the disk drive base 302 and the motor support 304. In certain embodiments, the interface 350 may optionally include a constrained viscoelastic material layer or film, e.g. a polymer that is in contact with and bounded by constraining surfaces of the interface 350.

In the embodiment of FIG. 3A, the motor support 304 may be embedded in the disk drive base 302 by press-fitting, such that the motor support 304 radially interferes with the first opening 336. In that case, the interface 350 between the motor support 304 and the first opening 336 would be a press fit interface. Specifically, for the interface 350 to be considered as a press-fit interface, there must be some interference between the first opening 336 and the motor support 304 (e.g. so that the interface 350 between the motor support 304 and the first opening 336 is characterized by compression of the embedded motor support 304, and tensile hoop stress in the disk drive base 302 around the first opening 336).

In certain embodiments, a bead of adhesive may be placed in the first opening 336, or on the motor support 304, prior to press-fitting the motor support 304 into the first opening 336, such that the adhesive gets drawn into the interface 350 during press-fitting. In such embodiments, the adhesive may act as a lubricant to facilitate press-fitting, for example with reduced press-fitting force. Alternatively or in addition, the lubricant may better seal the interface 350, for example to reduce leakage of an alternative gas (e.g. helium) from the disk drive enclosure after disk drive assembly.

In certain alternative embodiments, the motor support 304 may be embedded in the disk drive base 302 by being cast-in-place. In that case, the interface 350 between the motor support 304 and the first opening 336 would be a cast-in-place interface. Such a cast-in-place interface also may be characterized by radial interference, for example where the first metal material of the disk drive base 302 has a higher coefficient of thermal expansion than the second metal material of the motor support 304. In that case, the first metal material of the disk drive base 302 will shrink more during post-casting cooling than will the second metal material of the motor support 304, causing residual radial interference at the interface 350.

Figure 3B:
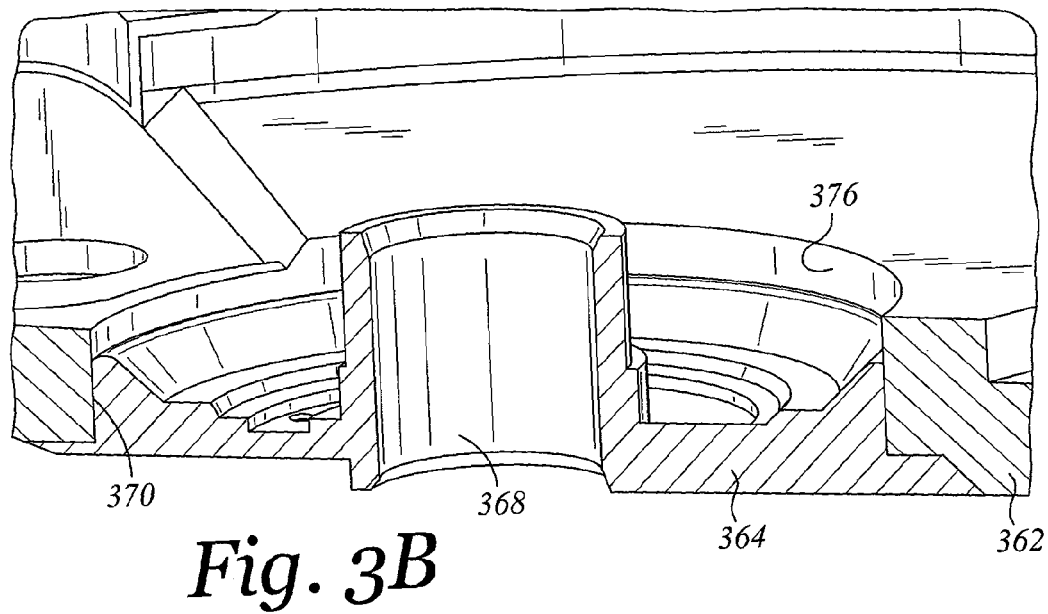
FIG. 3B is a cross-sectional perspective view of a motor support and disk drive base, according to another embodiment of the present invention.

FIG. 3B is a cross-sectional perspective view of a disk drive base 362, and a motor support 364 that is embedded in the disk drive base 362, according to an embodiment of the present invention. The motor support 364 includes a bore 368 for holding a bearing of a rotary spindle and thereby attaching the rotary spindle to the motor support 364. The disk drive base 362 comprises a first metal material (e.g. aluminum). The motor support 364 consists of a second metal material having a damping coefficient higher than that of the first metal material. For example, the second metal material may comprise iron. For example, cast iron, steel, and stainless steel, all comprise iron. The disk drive base 362 includes a first opening 376, and an interface 370 between the first opening 376 of the disk drive base 362 and the motor support 364. In certain embodiments, the interface 370 may optionally include a constrained viscoelastic material layer or film (e.g. a polymer that is in contact with and bounded by constraining surfaces of the interface 370).

In the embodiment of FIG. 3B, the motor support 364 may be embedded in the disk drive base 362 by press-fitting, such that the motor support 364 radially interferes with the first opening 376. In that case, the interface 370 between the motor support 364 and the first opening 376 would be a press-fit interface. Specifically, for the interface 370 to be considered as a press-fit interface, there must be some interference between the first opening 376 and the motor support 364 (e.g. so that the interface 370 between the motor support 364 and the first opening 376 is characterized by compression of the embedded motor support 364, and tensile hoop stress in the disk drive base 362 around the first opening 376).

In certain alternative embodiments, the motor support 364 may be embedded in the disk drive base 362 by being cast-in-place. In that case, the interface 370 between the motor support 364 and the first opening 376 would be a cast-in-place interface. Such a cast-in-place interface also may be characterized by radial interference, for example where the first metal material of the disk drive base 362 has a higher coefficient of thermal expansion than the second metal material of the motor support 364. In that case, the first metal material of the disk drive base 362 will shrink more during post-casting cooling than will the second metal material of the motor support 364, causing residual radial interference at the interface 370.

Figure 4:
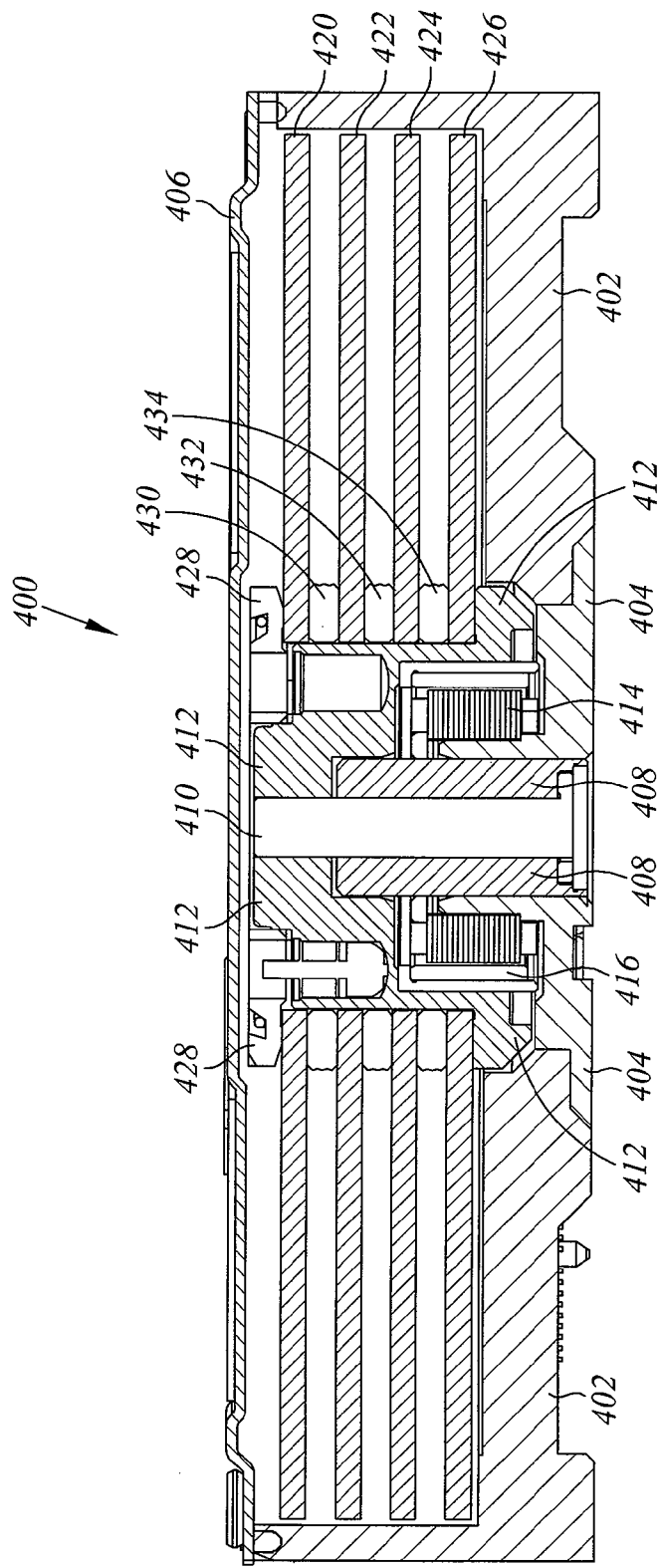
FIG. 4 is a cross-sectional view of a disk drive according to an embodiment of the present invention.

FIG. 4 is cross-sectional view of a disk drive 400 according to an embodiment of the present invention. Disk drive 400 includes a disk drive base 402 that comprises a first metal material. For example, the first metal material may be an alloy of aluminum that is cast and/or machined, stamped, or forged. Disk drive 400 also includes a motor support 404 embedded in the disk drive base 402. The motor support 404 consists of a second metal material having a damping coefficient higher than that of the first metal material.

In certain embodiments, the second metal material may be a metal alloy (e.g. combination of a metal with other metallic and non-metallic elements), in which case the motor support 404 would not include features that are not made from that same metal alloy. For example, the second metal material may be cast iron. The motor support 404 and/or the disk drive base 402 optionally may be plated with a third metal material such as nickel. Since the motor support 404 is considered to include only the second metal material, a plating on the motor support 404 is considered to be on (rather than in) the motor support 404.

In the embodiment of FIG. 4, a motor shaft 410 is supported by a bearing 408, which is held by the motor support 404. A motor hub 412 is attached to a top end of the motor shaft 410. The motor hub 412 is caused to rotate by a magnetic interaction between coils 414 and permanent magnets 416. Disks 420, 422, 424, 426 are mounted to the motor hub 412, and held in place on the motor hub 412 by a disk clamp 428. Spacers 430, 432, 434 are also mounted on the motor hub 412, between the disks 420, 422, 424, 426. A top cover 406, together with the disk drive base 402, encloses the disks 420, 422, 424, 426.

Figure 5:
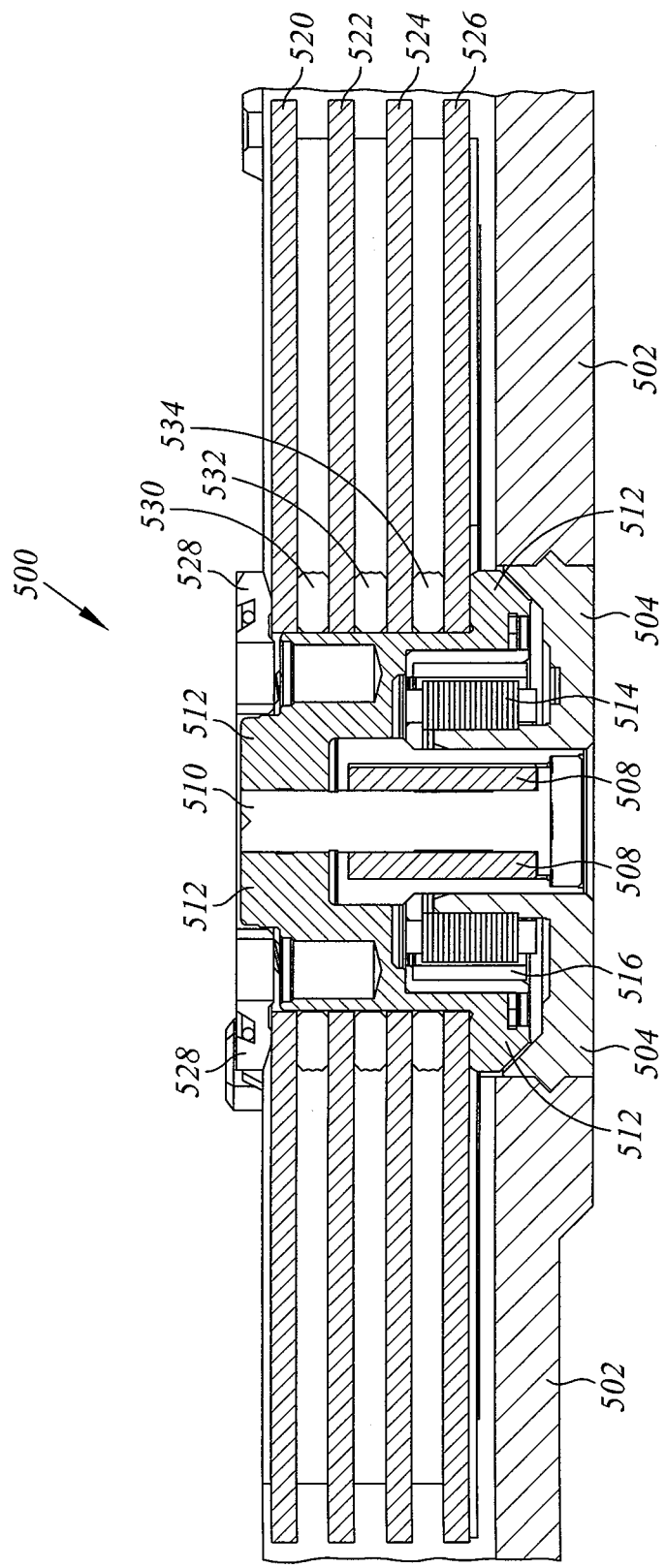
FIG. 5 is a cross-sectional view of a disk drive according to an embodiment of the present invention.

FIG. 5 is cross-sectional view of a disk drive 500 according to another embodiment of the present invention. Disk drive 500 includes a disk drive base 502 that comprises a first metal material (e.g. cast aluminum). Disk drive 500 also includes a motor support 504 embedded in the disk drive base 502. The motor support 504 consists of a second metal material having a damping coefficient higher than that of the first metal material.

In certain embodiments, the second metal material may be a metal alloy (e.g. combination of a metal with other metallic and non-metallic elements), in which case the motor support 504 would not include features that are not made from that same metal alloy. For example, the second metal material may be cast iron. The motor support 504 and/or the disk drive base 502 optionally may be plated with a third metal material such as nickel. Since the motor support 504 is considered to include only the second metal material, a plating on the motor support 504 is considered to be on (rather than in) the motor support 504.

In the embodiment of FIG. 5, a motor shaft 510 is supported by a bearing 508, which is held by the motor support 504. A motor hub 512 is attached to a top end of the motor shaft 510. The motor hub 512 is caused to rotate by a magnetic interaction between coils 514 and permanent magnets 516. Disks 520, 522, 524, 526 are mounted to the motor hub 512, and held in place on the motor hub 512 by a disk clamp 528. Spacers 530, 532, 534 are also mounted on the motor hub 512, between the disks 520, 522, 524, 526.

Figure 6:
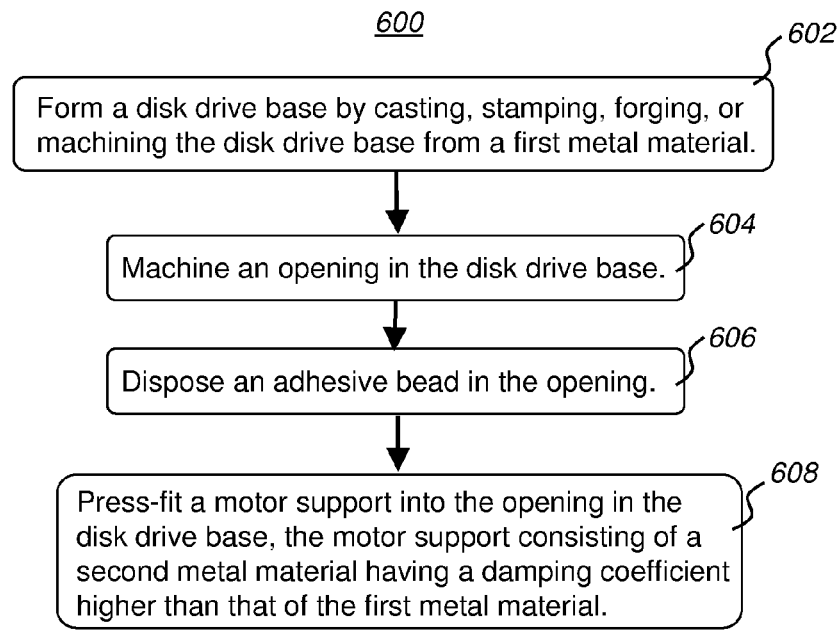
FIG. 6 is a flow chart of a method to fabricate a drive base, according to an embodiment of the present invention.

FIG. 6 is a flow chart of a method 600 to fabricate a drive base, according to an embodiment of the present invention. In step 602, a disk drive base may be formed by casting, stamping, forging, or machining a first metal material. In step 604, an opening may be machined in the disk drive base. For example, the opening that was created by casting may be machined by milling to more precise dimensions or a more desired surface finish. In step 606, a bead of adhesive may optionally be disposed in the opening. In step 608, a motor support may be press-fit into the opening in the disk drive base. In the context of step 608, embedding the motor support in the disk drive base is considered to be press-fitting if there is some interference between the opening in the disk drive base and the motor support (e.g. so that the motor support does not easily slide into the opening but rather must be forcibly pressed into it). The adhesive bead that may be disposed in the opening in step 606 may be drawn into the interface between the opening and the motor support during press-fitting. In such embodiments, the adhesive may act as a lubricant to facilitate press-fitting, for example with reduced press-fitting force. Alternatively or in addition, the lubricant may better seal the press-fit interface, for example to reduce leakage of an alternative gas (e.g. helium) from the disk drive enclosure after disk drive assembly.

In the step 608 of the embodiment of FIG. 6, the motor support may consist of a second metal material having a damping coefficient higher than that of the first metal material. For example, the first material may comprise aluminum and the second metal material may be cast iron. Optionally, the motor support may be plated (e.g. with nickel) before embedding the motor support into the disk drive base. In this regard, the word "before" need not imply immediately before, since there may be intermediate steps after plating but before embedding. Also, a viscoelastic material (e.g. a polymer) may be optionally disposed into an interface between the disk drive base and the motor support, for example so that the polymer is in contact with and bounded by constraining surfaces of the interface.

Figure 7:
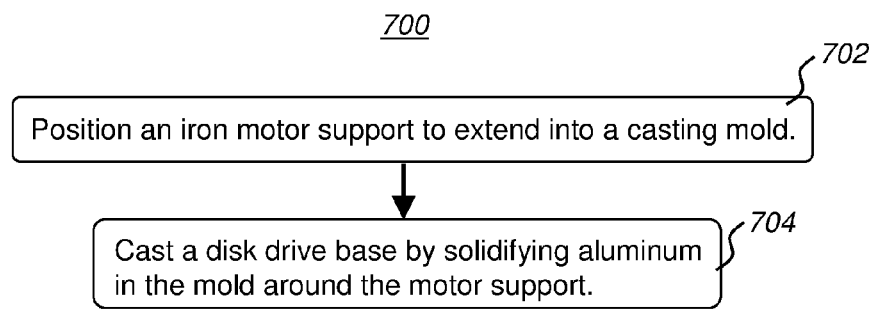
FIG. 7 is a flow chart of a method to fabricate a drive base, according to another embodiment of the present invention.

FIG. 7 is a flow chart of a method 700 to fabricate a drive base, according to another embodiment of the present invention. In step 702, an iron motor support is positioned to extend into a casting mold. In step 704, a disk drive base is cast by solidifying aluminum in the mold around the motor support. Optionally, one or more surfaces of the disk drive base and one or more surfaces of the motor support may be plated (e.g. with nickel) after the aluminum has solidified. In this regard, the word "after" need not imply immediately after, since there may be intermediate steps after solidification but before plating, such as cleaning steps.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A method to fabricate a disk drive, the disk drive including a head actuator assembly pivot and a rotary disk spindle, the rotary disk spindle including a bearing supporting a ratable motor shaft that is disposed therein, wherein the bearing is attached to the motor support, the method comprising:
    forming a disk drive base from a first metal material, the disk drive base including a first opening and including a first attachment feature to which the head actuator assembly pivot is attachable;
    embedding a motor support into the first opening in the disk drive base, the motor support being attachable to the rotary disk spindle, the motor support consisting of a second metal material having a damping coefficient higher than that of the first metal material; and
    disposing the bearing within and in contact with the motor support.

2. The method of claim 1 wherein forming the disk drive base includes machining, and wherein the motor support is embedded in the disk drive base by press-fitting the motor support into the first opening, the motor support interfering with the first opening.

3. The method of claim 1 further comprising disposing a viscoelastic material into an interface between the disk drive base and the motor support.

4. A method to fabricate a disk drive base for a disk drive, the disk drive including a head actuator assembly pivot and a rotary disk spindle, the method comprising:

forming a disk drive base from a first metal material, the disk drive base including a first opening and including a first attachment feature to which the head actuator assembly pivot is attachable; and embedding a motor support into the first opening in the disk drive base, the motor support being attachable to the rotary disk spindle, the motor support consisting of a second metal material having a damping coefficient higher than that of the first metal material;

wherein the disk drive base is formed by casting, and wherein the casting comprises melting the first metal material, pouring the first metal material around the motor support so that the motor support creates the first opening in the disk drive base, and wherein the motor support is embedded in the disk drive base by allowing the first metal material to solidify with the motor support embedded in the disk drive base.

5. The method of claim 4 wherein the first metal material comprises aluminum and the second metal material has a melting point higher than that of aluminum.

6. The method of claim 5, further comprising plating the disk drive base and the motor support after the first metal has solidified, and wherein the second metal material comprises iron.

7. A method to fabricate a disk drive base for a disk drive, the disk drive including a head actuator assembly pivot and a rotary disk spindle, the method comprising:

forming a disk drive base from a first metal material, the disk drive base including a first opening and including a first attachment feature to which the head actuator assembly pivot is attachable; and embedding a motor support into the first opening in the disk drive base, the motor support being attachable to the rotary disk spindle, the motor support consisting of a second metal material having a damping coefficient higher than that of the first metal material;

wherein forming the disk drive base includes machining, and wherein the motor support is embedded in the disk drive base by press-fitting the motor support into the first opening, the motor support interfering with the first opening; and further comprising plating the motor support before embedding the motor support into the disk drive base, and wherein the motor support comprises iron.

8. The method of claim 7 wherein the plating comprises electroless nickel plating.

9. A method to fabricate a disk drive base for a disk drive, the disk drive including a motor support to which a rotary disk spindle is attachable, the method comprising:

positioning a motor support to extend into a casting mold, casting a disk drive base by solidifying a first metal material in the mold around the motor support;

wherein the motor support consists of a second metal material having a damping coefficient higher than that of the first metal material.

10. The method of claim 9 wherein the first metal material comprises aluminum and the second metal material comprises iron.

* * * * *